(12) United States Patent
Obora et al.

(10) Patent No.: US 8,095,391 B2
(45) Date of Patent: Jan. 10, 2012

(54) SYSTEM AND METHOD FOR PERFORMING REINSPECTION IN INSURANCE CLAIM PROCESSING

(75) Inventors: Karoline M. Obora, Chicago, IL (US); Erica L. Heyward, Dublin, CA (US); Sean P. O'Connor, Schaumburg, IL (US); Dale A. Sailer, Glenview, IL (US); Thomas D'Souza, Buffalo Grove, IL (US); Gary C. Snyder, Vernon Hills, IL (US); Thomas B. Stiff, Crystal Lake, IL (US); Walter J. Wikman, Barrington, IL (US)

(73) Assignee: CCC Information Services, Inc., Chicago, IL (US)

( * ) Notice: Subject to any disclaimer, the term of this patent is extended or adjusted under 35 U.S.C. 154(b) by 1778 days.

(21) Appl. No.: 10/470,605

(22) Filed: Jun. 13, 2003

(65) Prior Publication Data

US 2005/0246206 A1 Nov. 3, 2005

Related U.S. Application Data

(63) Continuation of application No. 09/129,332, filed on Aug. 5, 1998, now abandoned.

(51) Int. Cl.
*G06Q 40/00* (2006.01)
(52) U.S. Cl. .............................. 705/4; 705/1.1
(58) Field of Classification Search ............ 705/2–4
See application file for complete search history.

(56) References Cited

U.S. PATENT DOCUMENTS

| | | | |
|---|---|---|---|
| 4,858,121 A | 8/1989 | Barber et al. | |
| 4,910,676 A * | 3/1990 | Alldredge | 705/37 |
| 5,128,859 A * | 7/1992 | Carbone et al. | 705/4 |
| 5,182,705 A | 1/1993 | Barr et al. | |
| 5,432,904 A * | 7/1995 | Wong | 705/4 |
| 5,504,674 A * | 4/1996 | Chen et al. | 705/4 |
| 5,537,590 A * | 7/1996 | Amado | 1/1 |
| 5,570,291 A * | 10/1996 | Dudle et al. | 700/95 |
| 5,752,236 A | 5/1998 | Sexton et al. | |
| 5,839,112 A * | 11/1998 | Schreitmueller et al. | 705/4 |
| 5,903,873 A | 5/1999 | Peterson et al. | |
| 5,950,169 A * | 9/1999 | Borghesi et al. | 705/4 |
| 6,006,242 A * | 12/1999 | Poole et al. | 715/209 |
| 6,029,144 A * | 2/2000 | Barrett et al. | 705/30 |
| 6,058,380 A * | 5/2000 | Anderson et al. | 705/40 |
| 6,115,690 A * | 9/2000 | Wong | 705/7.27 |
| 6,185,540 B1 * | 2/2001 | Schreitmueller et al. | 705/4 |

(Continued)

OTHER PUBLICATIONS

Capital requirements to support adverse loss development; Barth, Michael M; Journal of Insurance Regulation v14 n4; Summer 1996; 15-pages.*

(Continued)

*Primary Examiner* — Gregory Johnson
(74) *Attorney, Agent, or Firm* — Brinks Hofer Gilson & Lione

(57) ABSTRACT

A system and method for performing insurance claim reinspections is disclosed. The system includes an insurance company computer in communication with a communications server, at least one remote terminal in communication with the communications server, and an insurance claim workfile having a loss estimate section, an appraisal section and a reinspection section. The method includes the steps of providing an insurance claim profile and exception priority information, comparing an estimate in an insurance workfile to the insurance claim profile, and generating exception indicators based on the comparison.

47 Claims, 9 Drawing Sheets

U.S. PATENT DOCUMENTS

| | | | |
|---|---|---|---|
| 6,208,973 B1* | 3/2001 | Boyer et al. | 705/2 |
| 6,347,374 B1* | 2/2002 | Drake et al. | 726/1 |
| 6,856,974 B1* | 2/2005 | Ganesan et al. | 705/40 |
| 2003/0014318 A1* | 1/2003 | De La Motte et al. | 705/26 |
| 2005/0108140 A1* | 5/2005 | Motte et al. | 705/37 |
| 2005/0246206 A1* | 11/2005 | Obora et al. | 705/4 |
| 2008/0072334 A1* | 3/2008 | Bailey et al. | 726/28 |

OTHER PUBLICATIONS

New Claims System Designed to Speed Process; National Underwriter Property & Casualty-Risk & Benefits Management; Nov. 27,1995; 2-pages.*

Shifting into high gear; Best's Review—Property-Casualty Insurance Edition, v93, n1; May 1992; 5-pages.*

USAA Cuts Days Off Auto Body Repairs With Imaging; Electronic Imaging Report, v 2, n 1; Jan. 15, 1992; 3-pages.*

CCC Information Services Unveils Access Claims Services(SM); The Complete Auto Collision Claims Management Solution; Business Wire; Aug. 3,1995; 2-pages.*

CCC Introduces First-Ever Automated Claims Review Product; PR Newswire; May 6,1998; 2-pages.*

Golden, Kathleen. "Navigating Today's Data Superhighway," Insurance & Technology. Apr. 1994. p. 24.

Brown, Jim. "Future is Now for LU 6.2 User," Network World. Mar. 20, 1987. p. 1.

Fedorko, Chris. "BC's TelePlan a Healthy Fix for Efficient Medical Services Delivery," Computing Canada. Apr. 12, 1993. p. 49.

Eckerson, Wayne. "Firms Use Wireless to Improve Service," Network World. Apr. 20, 1992. p. 31.

Brochure from CCC Information Services Inc. entitled "Access Claim Services", dated 1995.

"Computer system integrates auto damage claim functions", Best's Review/Property-Casualty Insurance Edition, Jul. 1993, vol. 94, iss. 3, p. 65 ("CSI").

* cited by examiner

QUALITY ADVISOR APPRAISAL REVIEW
SAMPLE INSURANCE COMPANY
SAMPLE OFFICE
21C W. PAULINE ST.
DASDADAS, IL. 60606-7778
(312) 212-1212

832

WRITTEN BY: ELIZABETH CHAN
ADJUSTER: NITA TRINH

CLAIM NUMBER: 53-U182-09100           DATE OF LOSS: 06/27/1992
POLICY NUMBER: TEST EDI TRANSLATOR    TYPE OF LOSS: COLLISION

REPAIR      CCC'S BODY SHOP
FACILITY:   444 MERCHANDISE MART
            CHICAGO, IL 60654-1234              PH:(312) 222-4636

OWNER:      ANTONI J. SMITH                     DAY:(407) 267-2328
            4707 ST. LAWRENCE DR.
            FRIENDSWOOD, TX 77546               EVENING:

INSPECTION: CCC'S BODY SHOP
LOCATION:   444 MERCHANDISE MART
            CHICAGO, IL 60654                   PH: (407) 213-7842
            INSPECTION TYPE:

VEHICLE:    1987 CHEV FP2 8.5.0L-4 2D           PROD: 08/1986
            VIN: UNK                            LICENSE: SF EDI TX
            ODOMETER: 194212                    DAYS TO REPAIR: 7
            DRIVEABLE: YES                      POINT OF IMPACT:
                                                5. RIGHT REAR

APPRAISAL: LAST APPRAISED: $2,810.25
TOTAL APPRAISED: $3471.12

------- APPRAISAL REVIEW RESULTS -------

| RULE DESCRIPTION | RESULT | EXCEPTION RULE | EXCEPTION VARIANCE | CODE |
|---|---|---|---|---|
| -WORKFILE INFORMATION- | | | | |
| LAST APPRAISED EXCEEDS TOTAL APPRAISED | 80.9% | 20.0% | 60.9% | A |
| SUPPLEMENTS EXCEED ORIGINAL ESTIMATE | 80.9% | 40.0% | 40.9% | A |
| TOTAL LOSS THRESHOLD EXCEEDED | Y | - | - | A |

FIG. 8B

-ADMINSTRATIVE DATA AND VIN DECODE-

| | | | | |
|---|---|---|---|---|
| VIN VALIDATION | INVALID | VALID | - | A |
| INSPECTED MATCHES ASSIGNED VIN | N | Y | - | B |
| MILEAGE ENTERED | Y | Y | - | - |

-PARTS RATIO OF ESTIMATES-

| | |
|---|---|
| OEM | 23.8% |
| AFTERMARKET | 4.7% |
| SALVAGE/LKQ | 9.5% |
| REMANUFACTURED | 0.0% |

-REPAIR VS. REPLACE-

| | | | | |
|---|---|---|---|---|
| RCY PARTS SELECTED OF DISPLAYED | 0.0% | 25.0% | -25.0% | A |
| OEM PART DOLLARS % OF ESTIMATE | 22.0% | 70.0% | - | - |
| NUMBER OF MANUAL LINES ENTERED | 14 | 5 | 9 | A |
| NUMBER OF PAINT LINES OVERRIDDEN | 0 | 5 | - | - |

-ADDITIONAL PROFILE ELEMENTS-

| | | | | |
|---|---|---|---|---|
| AFTERMARKET SELECT | AUTO LIST | AUTO SELECT | - | A |
| REFINISH CAPS USAGE | Y | Y | - | - |
| CLEAR COAT HOURS | 2.5 | 3.0 | -0.5 | A |
| TL THRESHOLD FOR STANDARD VEHICLES | 100% | 40% | 60% | A |
| TL THRESHOLD FOR OLDER VEHICLES | 0% | 10% | -10% | B |
| TL CUTOFF YEAR FOR OLDER VEHICLES | 1966 | 1966 | - | - |
| BODY SUPPLIES CHARGES | Y | Y | - | - |

-CYCLE TIMES IN DAYS-

| | | | | |
|---|---|---|---|---|
| LOSS TO ASSIGNED | 2 | 10 | - | - |
| ASSIGNED TO APPRAISED | 4 | 2 | 2 | C |
| APPRAISED TO START OF REPAIRS | 2 | 1 | 1 | C |
| START OF REPAIRS TO COMPLETION | 2 | 2 | - | - |

-LABOR/MATERIAL RATES-

| | | | | |
|---|---|---|---|---|
| BODY | $1.00 | $10.00 | - | - |
| PAINT | $2.00 | $9.00 | - | - |
| MECHANICAL | $3.00 | $8.00 | - | - |
| FRAME | $4.00 | $7.00 | - | - |
| STRUCTURAL | $5.00 | $6.00 | - | - |
| DIAGNOSTIC | $6.00 | $5.00 | $1.00 | A |
| ELECTRICAL | $7.00 | $4.00 | $3.00 | A |
| GLASS | $8.00 | $3.00 | $5.00 | A |
| BODY SUPPLIES | $9.00 | $2.00 | $7.00 | A |
| PAINT SUPPLIES | $10.00 | $1.00 | $9.00 | A |

-PARTS RATE-

| | | |
|---|---|---|
| SUBTOTALS PARTS MARKUPS | 33.0% | 33.0% |

-TAXES

FIG. 8C

| | | | | |
|---|---|---|---|---|
| SALES | 99.0000% | 94.0000% | 5.0000% | A |
| TOTAL LOSS | 98.0000% | 95.0000% | 3.0000% | A |
| MUNICIPAL | 97.0000% | 96.0000% | 1.0000 % | A |
| COUNTY | 96.0000 % | 97.0000 % | -1.0000% | A |
| OTHER TAX 1 | 95.0000% | 98.0000% | -3.0000% | A |
| OTHER TAX 2 | 94.0000% | 99.0000% | -5.0000% | A |
| -DISCOUNTS- | | | | |
| PRE-TAX DISCOUNT | 55.0% | 100.0% | -45.0% | A |
| LABOR-BODY | 20.0% | 35.0% | -15.0% | A |
| LABOR-PAINT | 21.0% | 34.0% | -13.0% | A |
| LABOR-MECHANICAL | 22.0% | 33.0% | -11.0% | A |
| LABOR-FRAME | 23.0% | 32.0% | -9.0% | A |
| LABOR-STRUCTURAL | 24.0% | 31.0% | -7.0% | A |
| LABOR-DIAGNOSTIC | 25.0% | 29.0% | -4.0% | A |
| LABOR-ELECTRICAL | 26.0% | 30.0% | -4.0% | A |
| LABOR-GLASS | 27.0% | 28.0% | -1.0% | A |
| MATERIALS-BODY SUPPLIES | 28.0% | 27.0% | - | - |
| MATERIALS-PAINT SUPPLIES | 29.0% | 26.0% | - | - |
| MISC-EPC | 30.0% | 25.0% | - | - |
| MISC-STORAGE | 31.0% | 24.0% | - | - |
| MISC-TOTAL LOSS | 32.0% | 23.0% | - | - |
| MISC-TOWING | 33.0% | 22.0% | - | - |
| PARTS DOMESTIC | 34.0% | 21.0% | - | - |
| PARTS-GLASS | 35.0% | 20% | - | - |

FIG. 10

SYSTEM AND METHOD FOR PERFORMING REINSPECTION IN INSURANCE CLAIM PROCESSING

CROSS-REFERENCE TO RELATED APPLICATIONS

This application is a continuation of prior U.S. patent application Ser. No. 09/129,332, filed Aug. 5, 1998, titled "SYSTEM AND METHOD FOR PERFORMING REINSPECTION IN INSURANCE CLAIM PROCESSING," pending, the entirety of which, including the originally filed Microfiche Appendix, are hereby incorporated herein by reference.

REFERENCE TO COMPUTER PROGRAM LISTINGS SUBMITTED ON COMPACT DISC AND MICROFICHE

A Computer Program Listing Appendix is included, with computer program code listings on a compact disc pursuant to 37 C.F.R. 1.52(e). The Computer Program Listing Appendix includes a file of program code listing in ASCII format. The Computer Program Listing Appendix additionally includes a file of the program code listing in a "PDF" graphic image file. This graphic image file contains digital image scans of frames from a Microfiche Appendix previously submitted in the parent application (Ser. No. 09/129,332).

The total number of compact discs submitted herewith is 1 (submitted in duplicate as "Copy 1" and "Copy 2"), and the files included on the compact disc are as follows:

| File name | Creation date | Size (in bytes) |
| --- | --- | --- |
| listing_7482-17.txt | 2003 Jun. 12 | 18,767,055 bytes |
| listing_IMAGES_7482-17.pdf | 2003 Jun. 12 | 191,657,163 bytes |

The program code listing is also being provided as a Microfiche Appendix that is a copy of a Microfiche Appendix previously submitted in the parent application. This microfiche comprises 62 sheets having a total of 5,602 6,029 frames.

The Computer Program Listing Appendix and the Microfiche Appendix are submitted herewith and their contents are hereby incorporated herein by reference. The Computer Program Listing Appendix and the Microfiche Appendix include material that is subject to copyright protection. The copyright owner has no objection to the facsimile reproduction by anyone of the Computer Program Listing Appendix or the Microfiche Appendix as they appear in the U.S. Patent and Trademark Office patent files or records, but otherwise reserves all copyright rights whatsoever.

FIELD OF THE INVENTION

This invention relates to a system and method for managing the reinspection process of insurance claim appraisals and estimates. More particularly, this invention relates to a method and system of reinspecting individual insurance claims from the initial claim filing to post-completion of the final settlement, as well as overall management and control of the reinspection process.

BACKGROUND OF THE INVENTION

Insurance companies generally process a claim by performing a number of related tasks that include numerical cost estimates, information management, and communications between, for example, insurance company offices and employees in the field. The sum of tasks performed in claims processing make up the claim settlement process. The claim settlement process includes making estimates of losses and appraising values of damaged property. The estimates and appraisals are usually conducted by an appraiser or a repair shop. Reinspection is the process of auditing and evaluating the accuracy, quality and timeliness of claim estimates and appraisals.

Many insurance companies have weak or non-existent control over their appraisal process because reinspection is an exceptionally manual process. For appraisals and estimates, insurance companies evaluate the quality of the appraisal or estimate only after the appraisal or estimate has been completed. Desk reviewers manually review appraisals or estimates to ensure that the correct rates have been used. To perform this review, the desk reviewer will manually compare the appraisal or estimate with profile information defined by the insurance company. This profile information includes company specified rules and threshold values for estimate amounts, property damage limitations, loss limitations or discounts. The desk reviewer then completes paper forms to document the profile exceptions—where the appraisal or estimate deviates beyond the threshold values given in the profile. After completing the paper form, the desk reviewer may call the repair shop to negotiate a change in the estimate. A problem with reinspections is that they often are unable to affect the severity of the claim settlement (i.e., the money paid out) due to the time necessary to complete the reinspection process.

Management of the performance of the appraiser or repair shop is performed by manually logging any items found during the reviews onto paper forms for each appraisal reviewed. The results of the individual reinspections are then manually aggregated into a report that can be used to audit the performance of the appraiser or repair shop. Management of the reinspectors performance is typically cursory and insurance companies often find it difficult to evaluate the productivity of a reinspector because they have no ability to monitor their activity.

Accordingly, there is a need for a comprehensive system and method of managing the reinspection process of insurance claims to assist insurance companies in managing estimate and appraisal quality and timeliness. Further, it would be advantageous to provide an automated tool to address the entire reinspection process in order to reduce costs and leverage existing resources.

SUMMARY OF THE INVENTION

The present invention provides a system and method for achieving the foregoing. Preferably, a preferred embodiment of the system and method is able to capture the reinspection work early in the claims cycle, as close to the loss report and appraisal assignment as possible. According to a first aspect of the present invention, a method of reinspecting insurance claim appraisals is disclosed wherein the insurance claim appraisals are each contained within a respective electronic workfile, each of the workfiles holding all pertinent data for processing an insurance claim. The method includes the steps of providing an insurance claim profile and exception priority information, comparing a workfile to the insurance claim profile and identifying a list of exceptions based on the comparison.

According to another aspect of the present invention, an system for reinspecting an insurance claim workfile is disclosed. The system includes a first computer in communication with a wide area network where the first computer is capable of generating insurance claim workfiles and the wide area network is capable of bidirectional transmission of the workfiles. At least one of the insurance claim workfiles includes a loss estimate section, an appraisal section and a reinspection section, the reinspection section contains data on a reinspection of an insurance claim estimate. A reinspection tool is preferably stored in a computer readable medium residing on a second computer. The second computer is in communication with the first computer over the wide area network. In one embodiment, the reinspection tool provides means for creating a reinspection section of a workfile, or adding data to an existing reinspection of a workfile, using information derived from an analysis of data contained in other sections of said workfile. The method and system permit for efficient, automated reinspection of processed insurance claims.

BRIEF DESCRIPTION OF THE DRAWINGS

FIGS. 8A-8C are an example of an appraisal review report generated by the Communications server of FIG. 1.

FIG. 10 is a preferred screen from a graphic user interface for use with the system of FIG. 1 illustrating the reinspection section of the workfile.

DETAILED DESCRIPTION OF THE PRESENTLY PREFERRED EMBODIMENT

Figure 1:
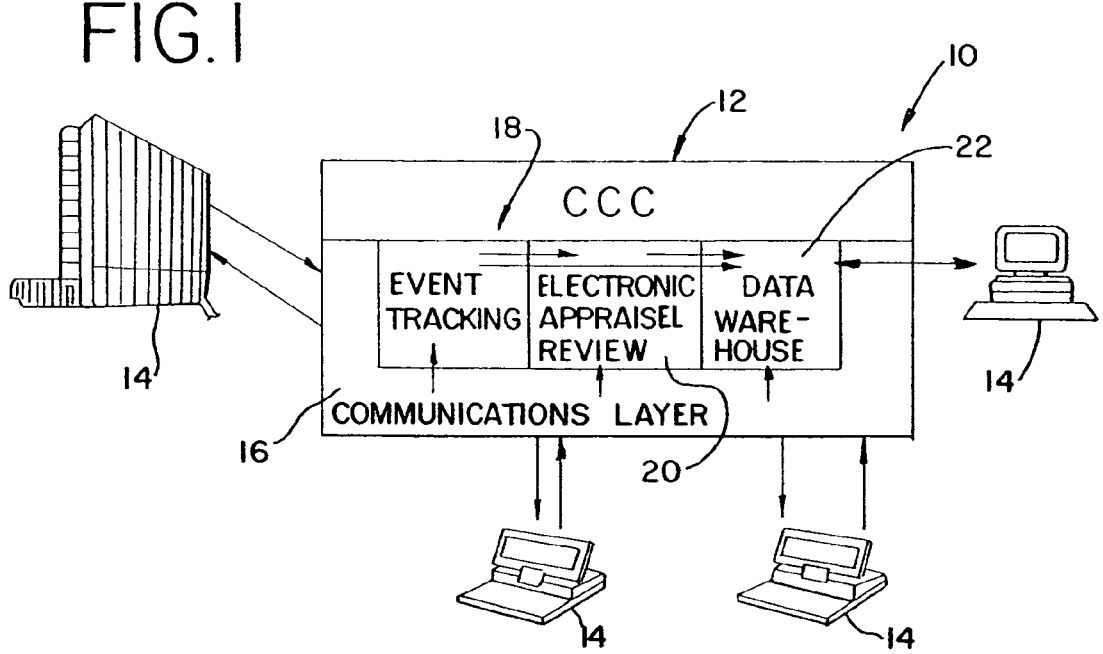
FIG. 1 illustrates a preferred system for appraisal assignment, appraisal audit and reinspection for a vehicle insurance claim.

FIG. 1 shows a preferred embodiment of a system 10 for managing the reinspection process of insurance claims. Preferably, the system 10 incorporates seamless or integrated PC-based applications with a common workfile/workflow-driven user interface. The system 10 includes a communications server 12 in communication with various remote computers 14, including those located at vendors, body shops, salvage yards, insurance companies, and other terminals which may be used in an insurance processing environment. The communications server 12 communicates with the remote computers 14 through a communication layer 16. The communication layer may communicate with event tracking software 18, electronic appraisal review software 20, and a data warehouse 22 at the communications server 12. One suitable communications server is an AIX server available from IBM. Alternatively, the communications server may be a distributed network of computers. A suitable communication layer is EZNet™ software available from CCC Information Services Inc. The remote terminals 14 preferably communicate over standard telephone lines via modem. As will be apparent to those of ordinary skill in the art, other communication formats (wireless, T1, and so on) may also be used.

Figure 2:
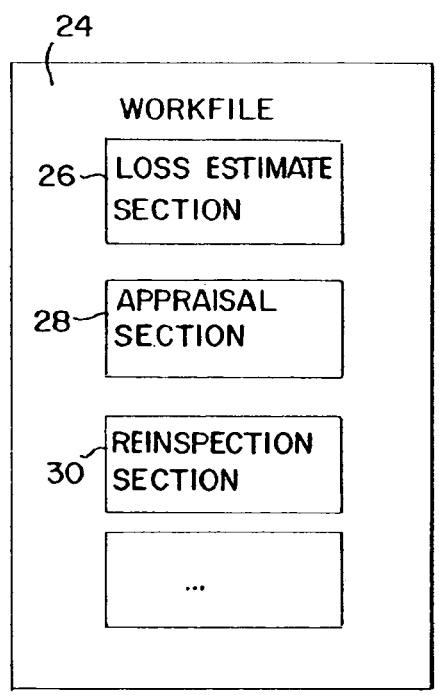
FIG. 2 is a block diagram illustrating an insurance claim workfile for use in the system at FIG. 1.
Figure 3:
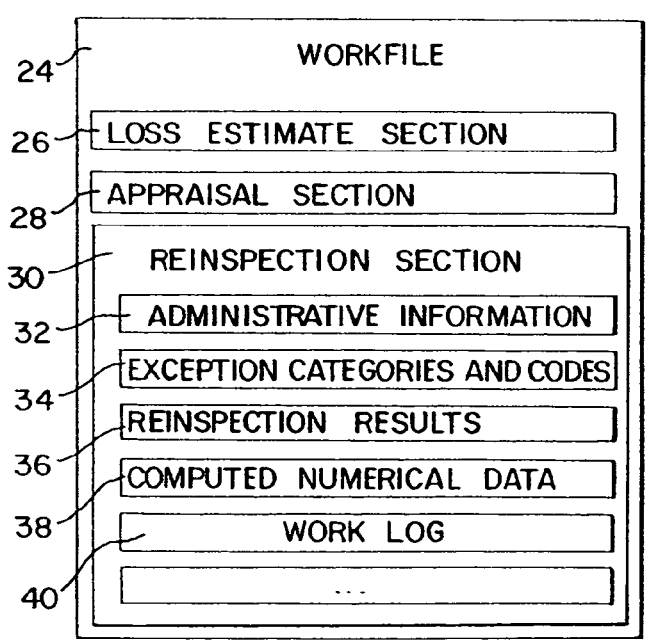
FIG. 3 is a block diagram illustrating the reinspection section of the workfile of FIG. 2.

Referring to FIG. 2, a particular insurance claim to be processed is preferably configured in an electronic datafile referred to herein as a workfile 24. Each workfile 24 represents one particular insurance claim. Each workfile is preferably stored in a memory device such as a hard disk drive or other commonly known storage device. The datafile is transferable, in its entirety, to remote computers and may be copied in part or in whole to provide status information to insurance company managers, claims office personnel, and reinspectors and others involved in the insurance claims process The workfile 24 contains all the necessary information for field processing of the insurance claim. This information includes information regarding the loss estimate 26 on the extent of the claim and appraisal information 28 on the value of the insured property. The workfile also contains insurance claim reinspection information 30 including analysis data of the estimate and appraisal information. As illustrated in FIG. 3, this reinspection information includes: administrative information 32, exception categories and codes 34, reinspection results 36 and numerical data 38 computed by the reinspector. In addition, the reinspection section also contains a work log 40 which logs all reinspection activity on the particular insurance claim. In one embodiment, the workfile is an evolving database entity that begins with the basic information on an insurance claim and an insured and has sections appended to it, such as the reinspection section, as the claim is processed.

The presently preferred system provides a user with the networking capability for transferring all or part of the workfile between computers. Thus, an appraiser can download a workfile from the communications server 12 to work on the appraisal for a claim which can then be sent back to the communications server 12 when complete. One suitable software package for allowing remote handling of insurance claim workfiles is the Pathways® Quality Advisor™ software available from CCC Information Services Inc. in Chicago, Ill. In a preferred embodiment of the present invention, the automated reinspection process is provided in the form of a software application such as disclosed in the attached microfiche appendix. Using this automated reinspection process, a reinspector can download completed workfiles and review the appraisal and estimate data in order to write a reinspection which is then uploaded for analysis by insurance company management. Protocol and formats for handling transmission of the workfile may be adjusted by the user within an "in box" and an "out box" provided in a graphic user interface as described below.

The communications server 12, or network provider, preferably has a plurality of flexible memory locations, or mailboxes, for storing insurance workfiles and communications. The data warehouse 22 of the communications server may be a mass storage device capable of storing insurance claim profiles (described below). In addition, it is preferable that the appraisal review function 20 of the server 12 have the ability to compare stored insurance claim profiles with workfiles also stored on the server and process the results into raw data or formatted reports for transmission to other computers in communication with the server. In one embodiment, this capability is provided by insurance processing software such as Quality Advisor Appraisal Review (QAAR) available from CCC Information Services Inc.

As mentioned above, computers 14 located at an appraiser, direct repair program (DRP) facility, or independent appraiser are also in communication with the server 12 over a communication line. The communications server preferably holds the master copy of each insurance datafile unless the assigned appraiser, Direct Repair Point (DRP) shop or independent appraiser is working on the specific insurance claim assignment associated with a workfile, or for completed assignments, the specific insurance claim is undergoing reinspection. The reinspector's computer preferably holds a copy of each insurance datafile that is associated with a respective specific insurance claim assignment currently assigned to an appraiser, DRP shop or independent appraiser.

Each remote computer 14 in the system 10 preferably has a processor, a display monitor, and memory. The processor, display monitor and memory may be embodied as an IBM-compatible personal computer. The memory may be embodied as a mass storage device. The processor is coupled to the mass storage device and display monitor. The mass storage device may a hard disk, compact disk, optical disk or other computer storage device. The mass storage device may also be used for archiving data. The main memory includes video memory which stores display format information for presentation on the display monitor. The information may be text, graphics, or a combination thereof The mass storage device stores a data base of text and graphics images that may in compressed digital form.

Figure 4:
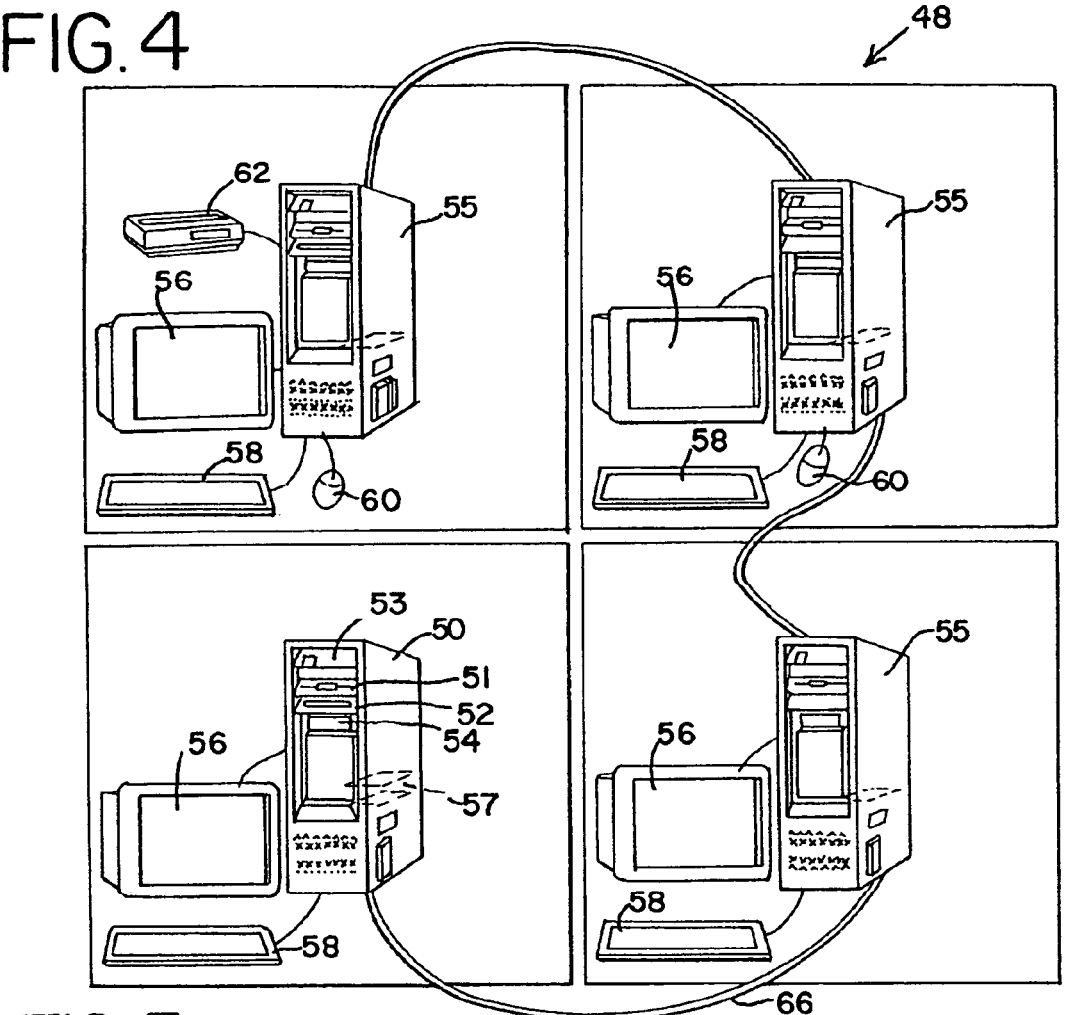
FIG. 4 is a block diagram of a system for use in managing insurance claim processing that may be used in the system of FIG. 1.

In other embodiments, one or more of the remote terminals 14 may be a local area network 48 as shown in FIG. 4. The local area network 48 may include one computer designated as a file server 50. The file server may comprise a computer having at least one floppy drive 51 of preferably 1.44 megabyte capacity, a tape backup drive 52, a CD ROM drive 53, and a hard drive 54 such a 2 gigabyte SCSI drive. The file server preferably also includes a processor suitable for use in IBM-compatible personal computers, such as the PENTIUM processor manufactured by Intel Corp., and an internal memory that may have 32 megabytes of RAM. A network connection maybe provided through a network card 57. The local area network 48 shown in FIG. 4 may operate with network software provided by any one of a number of commonly known manufacturers of network software. For instance, one suitable network software package is Netware 3.12 produced by Novell, Inc. Each of the remaining computers 55 preferably has a processor that may be used in an IBM-compatible personal computer. A hard drive memory is also preferred. The user of a single user system interacts with insurance claim workfiles via a monitor 56, a keyboard 58 and a computer mouse 60. Other input devices such as computer pens or touch screens may also be used. Optionally, a printer 62 may be used to print out reports. Each computer communicates with other databases and other computers outside the LAN via a modem connected to a wide area network 66 over regular telephone lines. The individual computers and file server may all be connected via a communications line 66 such as an ethernet coaxial network cable. One or more computers 55 may also be portable computers remotely connected to the LAN 48 server for ease of use by field appraisers and adjusters.

Figure 5:
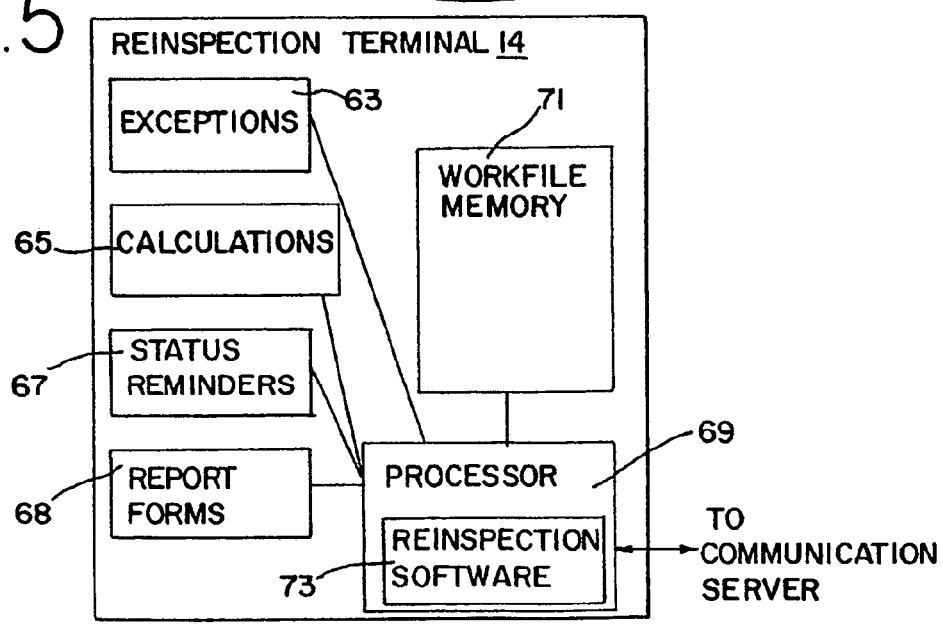
FIG. 5 is a block diagram of a reinspection terminal for use in the system of FIG. 1

As shown in FIG. 5, a remote terminal 14 for use by a reinspector includes several customizable databases for storing predetermined exception rules 63, calculations 65, status reminders 67, and report forms 68 for each insurance company utilizing the system 10. The exception rules 63, as explained in greater detail below, are guidelines for determining whether an appraisal meets with a particular insurance company's practice. The calculations database 65 preferably contains insurance company-specific formulas for use in the appraisal process. The status reminders database 67 is a custom set of automated schedule reminders for follow up work (faxes, telephone calls, etc.) necessary to conclude processing of a workfile. The report forms database 68 preferably contains electronic forms customized to each insurance company's standards for the reinspector to use in preparing reports to appraisers and repair shops on their performance. The report forms database 68 may also contain forms for the reinspector to prepare and send directly to an insurance company concerning the performance of appraisers/repair shops performing work for the insurance company. In order to preserve confidentiality between insurance companies utilizing one or more parts of the system 10, each reinspector will only have access to the portions of the customized databases pertinent to the insurance company or companies he works for. Also, the communications server 12 will only allow a reinspector access to workfiles specifically assigned to that reinspector. An advantage of the disclosed system and method for reinspection of insurance claims is that multiple insurance companies can utilize the system and implement customized processing procedures through the use of configurable databases at the communications server 12 and at the remote terminals 14 such as the exception rules 63, calculations 65, status reminder 67, and report form 68 databases. Also, revisions to these customizable databases can be centrally implemented at the communications server and sent to remote terminals any time a user at a remote terminal communicates with the communications server. For example, updated database information may be automatically sent to reinspectors every time a reinspector communicates with the communications server to upload or download workfile assignments and data in a preferred embodiment.

A workfile memory 71 in the remote terminal 14 contains all the workfiles assigned to the reinspector. A processor 69 in the terminal 14 executes reinspection software 73 residing on the terminal 14 to process a selected workfile downloaded from the communications server 12 and residing in memory 71. The processor 69 accesses the appropriate customized features from the various databases 63, 65, 67, 68 as necessary during preparation of a reinspection report.

Figure 6:
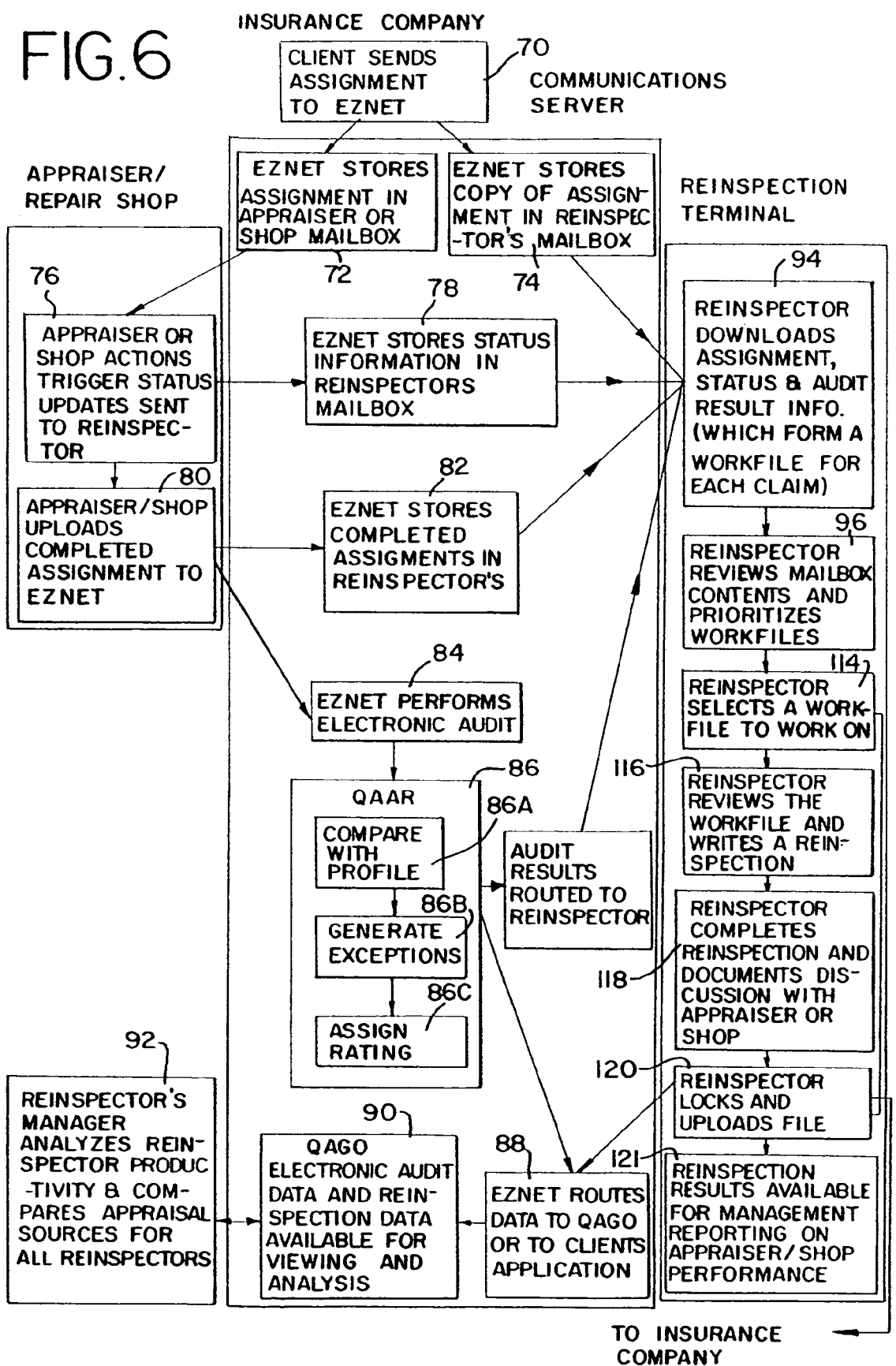
FIG. 6 is detailed flow chart illustrating the preferred method of managing the reinspection process for insurance claim processing.

Referring to FIG. 6, there is illustrated the preferred method of managing the workflow of the reinspection process utilizing the system 10 disclosed above. The process begins with the insurance company home office computer sending (at step 70) a claim assignment to the communications server 12. This claim assignment is generated when the insurance company receives a loss report by one of its insured. According to a preferred embodiment, the communications server routes the assignment to the mailbox of the appropriate appraiser/adjuster or body shop who will handle the claim (at step 72). The communications server also routes a copy of the assignment to the responsible reinspector who will handle the reinspection of the claim (at step 74). When the shop or appraiser downloads the assignment and completes an appraisal, key status updates such as "assignment downloaded," "estimate completed," "repairs scheduled, started or completed" are sent via the communications server to the responsible reinspector's mailbox, allowing her to review the time it takes the appraiser or body shop to process the claim, also known as the claim cycle time (at steps 76, 78). In addition, when an assignment is completed by the appraiser or shop, the completed workfile is uploaded to the communications server (at step 80). The communications server routes this completed workfile to the responsible reinspector's mailbox and performs an electronic appraisal review 82 of the workfile (at steps 82, 84).

Figure 7:
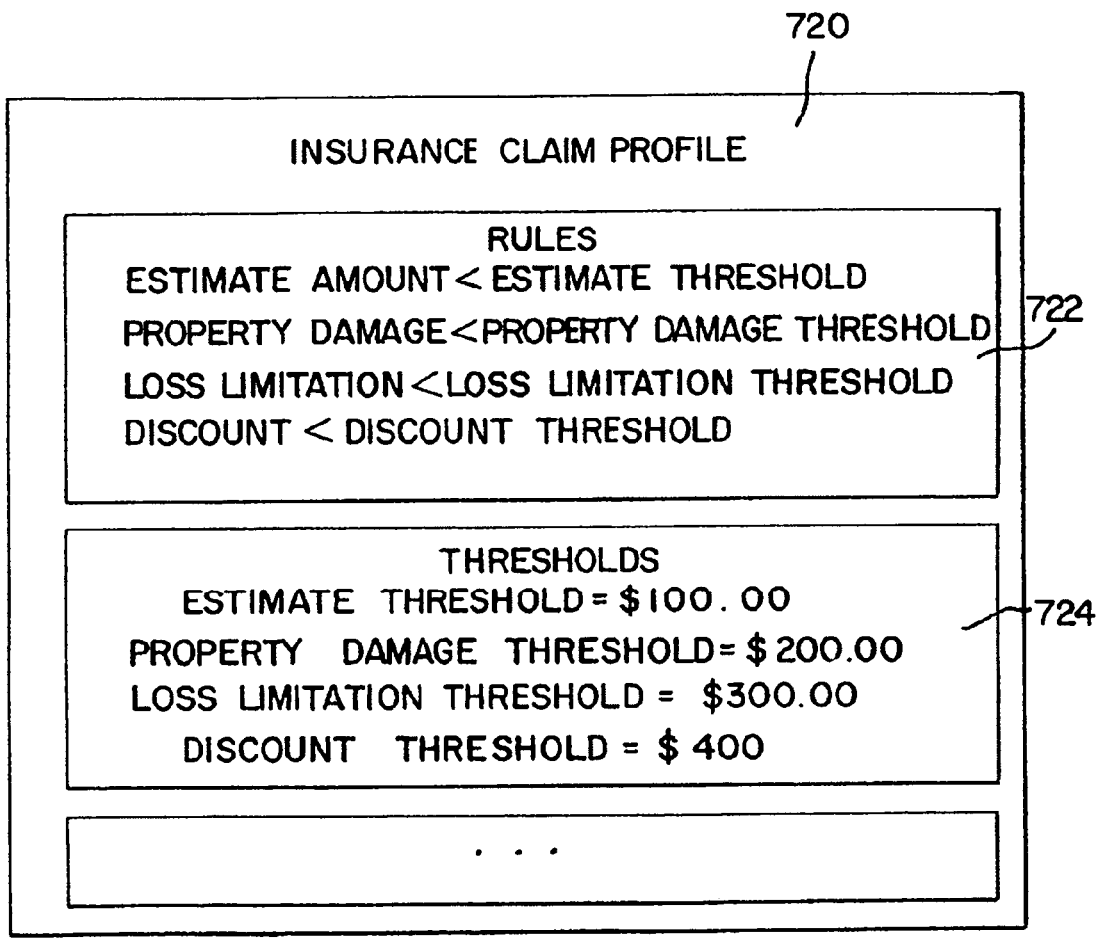
FIG. 7 is a block diagram of an insurance company insurance claim profile.

The electronic appraisal review is performed by executing a comparator program 86 which compares the information contained within the workfile with profile information provided by the company (at step 86A). This profile information can include company specified rules 722 and threshold values 724. As illustrated in FIG. 7, in a preferred embodiment, the profile information 720 is a datafile stored on the communications server 12 containing rules 722 and threshold values 724 for analyzing estimate amounts, property damage limitations, loss limitations or discounts. The comparison of insurance claim workfile to the profile produces a list of exceptions where the information contained in the workfile deviates from the model information contained in the profile (at step 86B). An example of a rule 722 would be instructions to flag a loss estimate as an exception if the supplement amount exceeds 20% of the original estimate. A supplement amount refers to an additional cost added to the original estimate by the appraiser (or repair shop). Supplements typically indicate that the appraiser/repair shop overlooked some damage in the initial damage appraisal and thus may indicate inefficient claims processing.

Based on guidelines provided by the insurance company, these exceptions are prioritized by severity levels or categories such as A, B or C where A=high priority, B=moderate priority and C=low priority. The comparator program 86 assigns the overall workfile a rating based on the exceptions generated which can be used to prioritize the workfile among other workfiles in the reinspector's workload (at step 86C). In one preferred embodiment, the electronic appraisal review comparator program is the Quality Advisor Appraisal Review (QAAR) software available from CCC Information Services Inc. Preferably, the comparator program running on the communications server provides the reinspector at the remote terminal with ASCII text and data from which to generate a reinspection section of a workfile, or add to an existing reinspection section in a workfile.

An advantage of the profile information being stored on the communications server in that it may be easily updated and revised as the insurance company's policies change. In a preferred embodiment, the communication, server 12 is in communication with multiple insurance companies, each operating with its own profile data requirements. In this embodiment, the communications server 12 maintains a database of the profile information for each insurance company utilizing the services of the communications server. The workfiles for each insurance company include insurance company identifying information so that the appropriate profile information is compared to the appropriate insurance claim workfile.

The results of the electronic appraisal review are routed to the responsible reinspector's mailbox in a report format (at step 88). FIGS. 8A-8C illustrate a preferred report 830 generated by the communications server based on the comparison of profile information to information in a workfile. The report 830 includes identifying information 832 such as claim number, vehicle information, and the names and addresses of all those involved in processing the insurance claim. The appraisal review results 834 are provided in a series of columns. The columns include a rule description 836, the actual result of the appraisal 838 related to the described rule, the numerical or boolean exception threshold of the rule profile 840, the percentage difference 842 between the actual appraisal result 838 and the threshold 840, and the exception code 844 assigned to the comparison of the rule and the actual appraisal.

The raw result data is available for transmission or downloading for analysis by management using reporting tools (at step 90). In one embodiment, a reporting tool residing on the communications server 12 may be used to generate suitable reports. Using this data, insurance company management is able to review the reinspection process by analyzing the reinspection data for trends in the reinspection work of a particular reinspector or reinspectors in a geographical area (at step 92). As with the comparator program, the reporting tools are also available for use by any number of different insurance companies. Preferably, the reporting tools gather information from, and only permit access to, an insurance company's own insurance workfiles.

Figure 9:
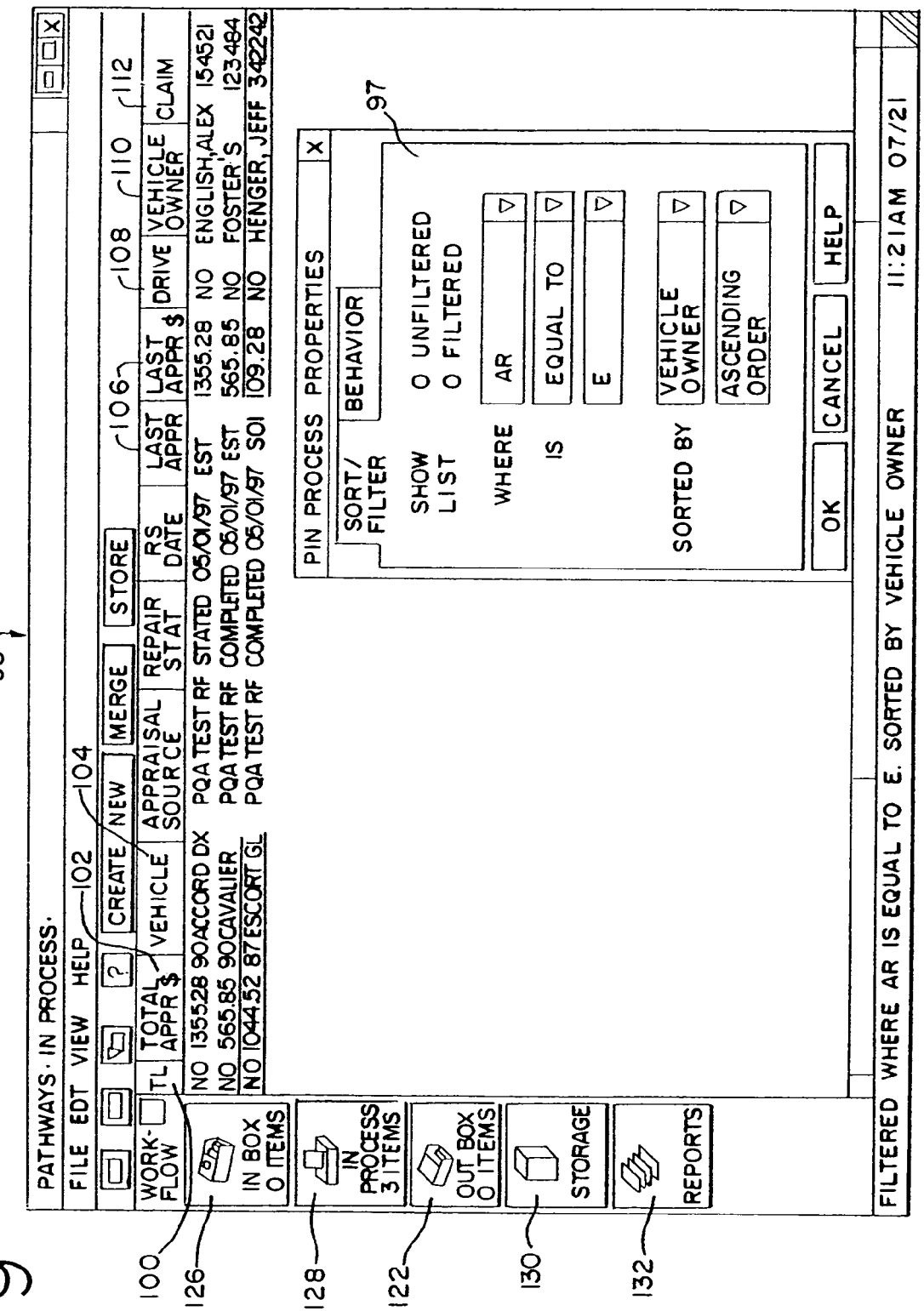
FIG. 9 is a preferred screen from a graphic user interface for use with the system of FIG. 1 illustrating the filter and sort functions.

Periodically, the responsible reinspector downloads the claim assignment copies, completed estimate and supplemental reports and data, claim assignment status information and electronic audit results that form the workfile (at step 94). In a preferred embodiment, this can be done by a reinspector at a terminal remotely located from the server 12. Preferably, a user interface on the reinspector's terminal 14 is configured for accessing the workfiles and performing the reinspections. The remote reinspector's terminal allows tracking of all claim activity, prioritization of workfiles to be worked on and documenting of the client's reinspections. The reinspector has the ability to review all workfiles assigned to him and contained within his mailbox (at step 96). He can prioritize, sort or filter the workfiles to suit his priorities or tasks for that day. As illustrated in FIG. 9, the reinspector can use a sort or filter function 97, through a graphic user interface 98, to sort and filter workfiles based on criteria such as: repair status (Open, Scheduled, Started, Closed, and etc.), new work (by date assigned), electronic appraisal review exception priorities which have been provided by the electronic audit performed by the comparator program running on the communications server 12, total loss status 100 (Yes or No), total appraisal amount 102, vehicle type 104, last appraisal written and associated amount 106, whether the vehicle is driveable 108; vehicle owner 110, or claim number 112. As referred to above, appraisals may include supplements added at a later time. A total appraisal amount is the sum of the original appraisal and any supplements for the vehicle. The last appraisal refers to the most recent supplement written for a vehicle that has already received an original appraisal.

After sorting or filtering, the reinspector selects a workfile to process, reviews the administrative information and writes a reinspection of the selected file (at steps 114 and 116). The user interface 98 provides the ability to juxtapose data from other sections of the workfile, such as estimate information, with the reinspection data for comparison and analysis. To reinspect the appraisal, the reinspector opens the file and looks at the results from the comparator program sent from the communications server. Preferably, the reinspector's remote terminal possesses a complete listing of the insurance company claim profiles stored on a computer readable medium. The reinspector then calculates what the appraisal should have been, according to the insurance company claim profiles, and enters that amount into the workfile through the user interface 98. Upon completion of a reinspection, the reinspector will document any discussions with the appraiser or shop, and whether a supplement and/or a re-reinspection is required (at step 118). This information creates follow up entries in the work log maintained in the workfile. The reinspection work log automatically creates a time-stamped entry in the workfile indicative of any actions taken by the reinspector. The reinspector will then lock the reinspection using a file locking function available through the reinspection tab of the user interface 98 (at step 120). This step of locking protects the data in the workfile from accidental editing, moves it to the out box 122 and readies it for uploading back to the communications server 12 or for direct transmission to the appropriate insurance company.

The results of the reinspection are stored (at step 121) on the remote computer and available for management reporting on the unit. The reinspector will use preloaded reinspection report forms available at the remote terminal to the various reports to assess appraiser or shop performance. The reinspection report forms may include information such as insurance company specific criteria on percentage satisfaction. The percentage satisfaction criteria represents a claim processing efficiency rating. Each individual insurance company may have its own formulation for efficiency and the appropriate formulation or formulations are preferably available to reinspectors on the remote terminal 14. By way of example, one formula for percentage satisfaction may be a ratio of the total appraisal to an ideal appraisal based on the particular insurance company's appraisal rules less a variable based on the amount of time the appraiser took to process the claim. As mentioned above, once the workfile is uploaded back to the communications server, the results are available for analysis by management for an insurance company through a reporting tool such as CCC's Quality Advisor for Guidepost Online™ (QAGO) which provides viewing and analysis functions including consolidated reporting, automated comparisons and trend analysis (at step 90).

Each reinspector or authorized insurance company employee, whether using a stand alone computer or a computer in a local area network, may access the assigned or pertinent claim workfile through the graphic user interface. The graphic user interface displays at least one workfile/datafile in addition to visual objects representative of actions to be taken on a workfile. In a preferred embodiment, an opened insurance claim workfile appears on a display monitor as a plurality of tabbed sections, each tabbed section representing a separate view of the workfile. A user may access each of the tabs by using a keyboard or other user input means.

Figure 10:
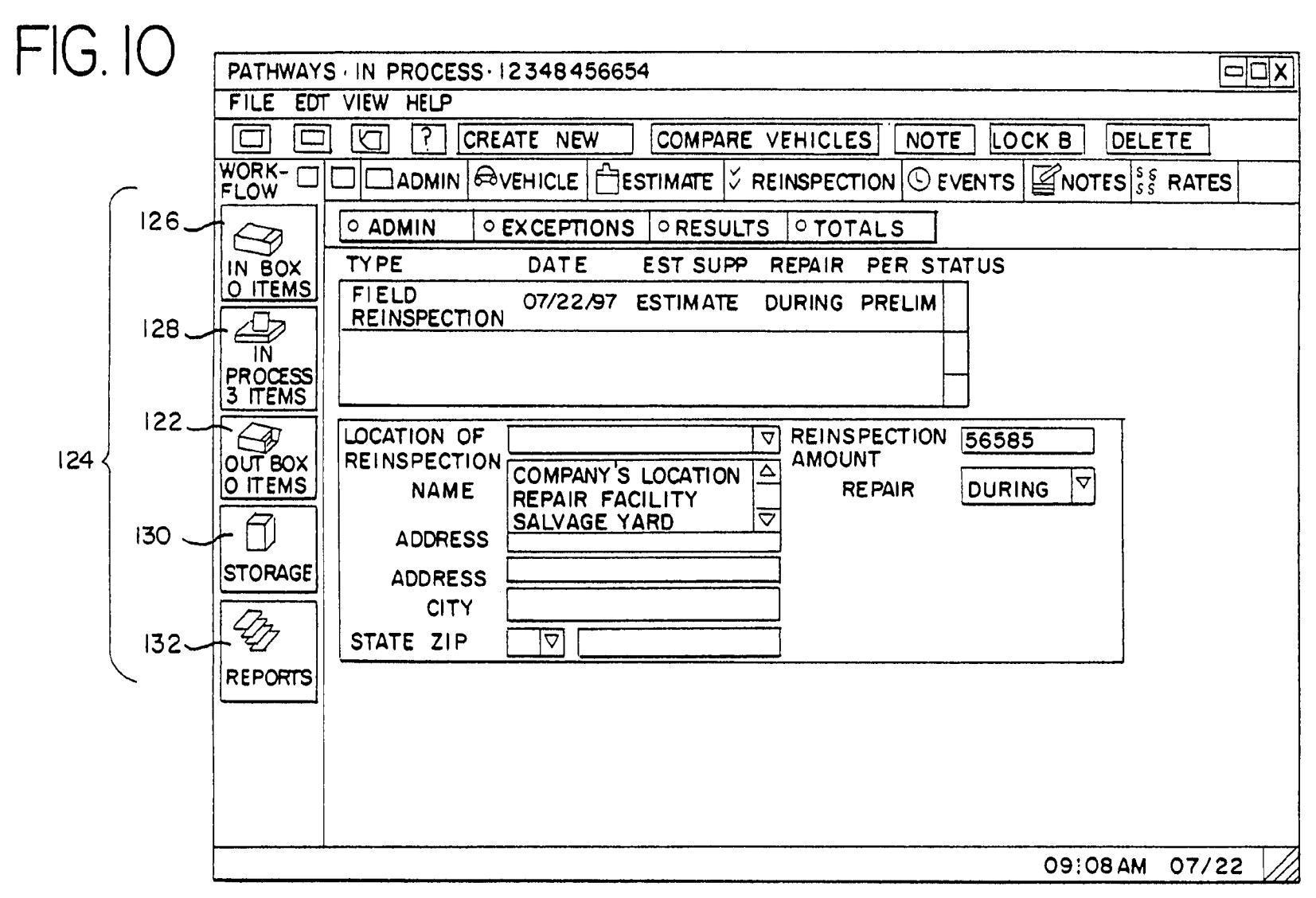

As illustrated in FIG. 10, a preferred graphic user interface for use with the preferred embodiment method and system allows an authorized user to access the reinspection processing workflow for one or more insurance claim workfiles. The graphic user interface not only permits a user to enter and retrieve information from a workfile, but also permits the user to execute tasks involved in reinspection processing such as manipulating a plurality of claim workfiles, opening a specific work file and working on estimate data or correspondence related to the open file. The interface also provides for communicating with repair facilities and insurance company staff. The graphic user interface may be constructed using known software tools and languages such as Visual C++ produced by Microsoft Corp., RATIONAL ROSE produced by Rational Corp., and the IBM CUA Library produced by IBM, Inc.

The graphic user interface of FIG. 10 includes a perspective bar 124 having a plurality of user objects representing basic office workflow. The user objects represented on the display monitor mirror the objects used by a typical user in an everyday work environment. The perspective bar 124 has an in box 126 for receiving assignments that have been processed, an in process box 128 for holding workfiles and information that a user is working on, and an out box 122 for completed workfiles. Access to storage locations which may be a hard disk drive, is provided through a storage icon 130. Report forms are accessible through a report icon 132.

The graphic user interface also includes a tool bar made up of objects that allow the user to perform necessary tasks such as printing, and context sensitive buttons that appear on the bar when certain tasks may be required by the screen presently being viewed. According to a preferred embodiment, the context sensitive buttons, such as the "Delete" button in FIG. 9, will disappear when the screen on the display monitor does not require the option represented by the context sensitive button. The interface also includes a menu bar having one or more pull-down menus and a title bar, which may include general information concerning the filename of the displayed file and the user's location in the claims processing workflow.

The perspective panel 124 may be selected as always visible regardless of what point in the reinspection processing a user is at. Regardless of whether a user is using a local area network (LAN), a wide area network (WAN) or a stand alone computer, the in box 126 retains all the mail addressed to that particular user. The out box 122, which is located on the same screen as the in box, is also essentially independent of the type of network or stand alone computer a user happens to be working on. Mail is sent from the out box whenever a user confirms the completion of the files contained in the out box. Both the in box and the out box will connect to the communications server 12 or other desired destinations so that assignments, entire workfiles, and miscellaneous claim information may be passed back and forth: In one preferred embodiment, users do not have individual in and out boxes but are able to filter the contents of a central in or out box so that it may selectively view the contents. In another preferred embodiment, each individual user is assigned an in box containing only those electronic workfiles relevant to the particular user.

The in process box 128 is used for those workfiles a reinspector is working on. A workfile remains within the in process box for as long as it takes to complete the various steps or transactions required for reinspection of the workfile. This time will of course vary with the complexity of the claim that the workfile represents. When the in process box 128 is selected, the graphic user interface displays the number of items or work files in process, with each workfile appearing as a folder in the main screen area. Each folder is identified by the insured's name; make of the vehicle; and the job number assigned. To open a particular workfile with a mouse, the user can either double-click on the desired folder or use the "open" button provide near the top of the screen. Keyboard access to work files may be achieved through use of arrow keys, the space bar and the "enter" key.

Within the in process box, an individual workfile opened for work is displayed. The workfile preferably comprises a plurality of individual sections represented by tabs that designate the contents of that section. In one preferred embodiment, a section tab extension is included to allow for extra sections to be referenced without cluttering up a viewer's screen. Within each of the sections of the workfile, a frame switching button bar having a number of frame switching buttons is included.

Once a particular workfile in the in process box has been opened, the user is provided with the overlapping tab format, visible to a user as overlapping folders, or tab icons, summarizing categories of information applicable to the workfile. As described above, the section tabs may include text and graphic designations for subjects such as administrative information, vehicle data, estimates, total loss information and reinspection information. A user may view or manipulate the data accessible in each of the tabs.

Reinspection information stored in the "REINSPECTION" tab includes several frames of information accessible through the frame switching button bar inside the tab. Preferably, the information comprises administrative information, customized exception categories and codes, reinspection results and a listing of any follow-up activities that need to be completed, and numerical data computed by the reinspection software on the reinspector terminal 14. Further, the administration information preferably provides the ability to juxtapose data from other sections of the workfile with data contained in the reinspection section to allow comparison and transfer of data. The user interface acts to seamlessly connect the different functional modules used to calculate and process discrete steps of an insurance claim reinspection task.

From the foregoing, a comprehensive system and method for managing the reinspection process of insurance claims has been described. The system includes at least one remote computer, a mainframe computer (or server), and a network connecting the computers wherein an insurance claim datafile containing information pertinent to a particular claim may be transferred, accessed and processed by authorized parties to add reinspection information. A common graphic user interface allows users to manage reinspection workflow, including filtering and prioritizing of assigned workfiles. Additionally, a method of reinspecting an insurance claim has been described that permits a reinspector to manage a reinspection from the initial claim assignment through the completed estimate and appraisal as well as manage large numbers of simultaneous reinspection assignments. Further, the method described provides for management reporting, analysis and control of the entire reinspection process.

Using the system and method described above, an insurance company can manage the severity of, and control, loss adjustment expenses, manage large numbers of claims efficiently, improve claim cycle time, streamline the appraisal and reinspection process, and provide positive feedback to repair shops and appraisers to allow them to write higher quality estimates and appraisals in the future.

It is intended that the foregoing detailed description be regarded as illustrative rather than limiting, and that it be understood that the following claims, including all equivalents, are intended to define the scope of this invention.

We claim:

1. A method of reinspecting insurance claim appraisals by a computer having a processor capable of executing the method, wherein each of said insurance claim appraisals are contained in a respective one of a plurality of insurance claim workfiles, each insurance claim workfile comprising all pertinent data for processing an insurance claim, said method comprising the steps of:
   automatically notifying by the computer a reinspector that an insurance claim assignment has been made when said insurance claim assignment is transmitted to one of an appraiser and a repair shop;
   automatically transmitting from the computer status information to said reinspector as said insurance claim assignment is processed;
   automatically assessing by the computer claim cycle time by monitoring said status information;
   providing by the computer an insurance claim profile database and an exception priority database, the insurance claim profile database comprising a set of appraisal rules;
   comparing by the computer the insurance claim workfiles to said insurance claim profile database, wherein said insurance claim profile database contains rules and threshold values relating to estimate amounts, property damage limitations, or discounts; and
   generating by the computer a list of exceptions based on said comparison, wherein at least one of the exceptions is based on a loss estimate that exceeds a specified percentage of an original estimate.

2. The method of claim 1 further comprising the steps of:
   comparing by the computer the list of exceptions to said exception priority database; and
   generating by the computer rating information based on said comparison to said exception priority database.

3. The method of claim 2 further comprising the steps of:
   providing a first computer in communication with a wide area network, said wide area network in communication with a second computer, said wide area network comprising a communications server;
   sending said insurance claim workfile from the second computer to said communications server over said wide area network;
   storing said insurance claim workfile in an electronic mailbox in said communications server;
   retrieving said insurance claim workfile at the first computer from said communications server; and
   building a reinspection section for said retrieved insurance claim workfile at the first computer using the list of exceptions and information derived from an analysis of data contained in other sections of said insurance claim workfile.

4. The method of claim 3, wherein the step of building a reinspection section further comprises the steps of:
   recognizing an insurance company identifier in the insurance claim workfile and retrieving exception rule information associated with the insurance company identifier from an exception rule database at the first computer; and
   applying the exception rule information to the reinspection section of the insurance claim workfile to generate a reinspection report.

5. The method of claim 3, wherein the step of building a reinspection section further comprises the steps of:
   recognizing an insurance company identifier in the insurance claim workfile and retrieving calculation format information associated with the insurance company identifier from a calculation format database at the first computer; and
   applying the calculation format information to the reinspection section of the insurance claim workfile to generate a reinspection report.

6. The method of claim 3, wherein the step of building a reinspection section further comprises the steps of:
   recognizing an insurance company identifier in the insurance claim workfile and retrieving insurance claim status reminder information associated with the insurance company identifier from an insurance claim status reminder database at the first computer; and
   applying the insurance claim status information to the reinspection section of the insurance claim workfile to generate an insurance claim status reminder associated with the insurance claim workfile.

7. The method of claim 3, wherein the step of building a reinspection section further comprises the steps of:
   recognizing an insurance company identifier in the insurance claim workfile and retrieving at least one reinspection report form associated with the insurance company identifier from a reinspection report form database at the first computer; and
   generating a reinspection report with the reinspection report form at the first computer.

8. The method of claim 3, wherein the step of building a reinspection section further comprises the steps of:
   formatting said rating information into a report;
   storing said report in an electronic mailbox in said communications server; and retrieving said report from said communications server at the first computer whereby a user may analyze the report at the first computer.

9. A system for reinspecting an insurance claim workfile comprising:
a first computer in communication with a wide area network, said first computer capable of generating insurance claim workfiles, said wide area network capable of bi-directional transmission of said insurance claim workfiles;
at least one of the insurance claim workfiles comprising a loss estimate section, an appraisal section and a reinspection section, the reinspection section having data on a reinspection of an insurance claim estimate;
insurance claim workfile filter means for automatically filtering a plurality of insurance claim workfiles based on predetermined criteria comprising repair status;
an insurance claim profile database comprising appraisal rules and threshold information;
a comparator capable of comparing at least one of said insurance claim workfiles to said insurance claim profile database, wherein said insurance claim profile database contains rules and threshold values relating to estimate amounts, property damage limitations, or discounts; and
an appraisal review generator configured to identify exceptions to said appraisal rules and threshold information and generate appraisal review information and a priority rating for each insurance claim workfile based on said appraisal rules and threshold information, wherein the appraisal review generator is further configured to prioritize the insurance claim workfiles based on a pre-defined criteria.

10. The system of claim 9 further comprising a reinspection tool stored in a computer readable medium residing on a second computer, said second computer in communication with said wide area network, wherein said reinspection tool provides means for adding data to said reinspection section of said insurance claim workfile using information derived from an analysis of data contained in other sections of said insurance claim workfile.

11. The system of claim 9 further comprising:
a communications server in communication with said wide area network capable of receiving and transmitting at least one of said insurance claim workfiles between said first computer and said server and between said second computer and said server;
an electronic mailbox in said communications server capable of storing said at least one insurance claim workfile; and
wherein said reinspection tool further provides means for retrieval of said insurance claim workfile from said electronic mailbox.

12. The system of claim 9 wherein each of said insurance claim workfiles contains data on an insured, data on a claim, data on satisfying a claim and data on reinspection activity.

13. The system of claim 10 further comprising:
a status generator capable of monitoring an activity associated with each of said insurance claim workfiles and generating status information based on said activity;
a communications server in communication with said wide area network capable of receiving and transmitting said status information between said first computer and said server and between said second computer and said server;
an electronic mailbox in the server capable of storing said status information; and
wherein said reinspection tool further provides means for retrieval of said status information from said electronic mailbox.

14. The system of claim 9 further comprising a file converter capable of converting the entire insurance claim workfile into a formatted insurance claim workfile to allow transmission over said wide area network.

15. The system of claim 14 wherein the entire formatted insurance claim workfile is transmitted from a remote computer to a communications server via the wide area network whereby said entire formatted insurance claim workfile is retrievable from said server.

16. The system of claim 14 wherein said file converter comprises means for formatting the insurance claim workfile into network TCP/IP, whereby a remote computer may readily communicate with, and transfer the entire insurance claim workfile to, a computer in a home office.

17. The system of claim 9 further comprising:
a communications server report generator capable of formatting said appraisal review information and priority rating into a report; and an electronic mailbox in the server, wherein said electronic mailbox is capable of storing said report; and further wherein said reinspection tool further provides means for retrieval of said report from said electronic mailbox.

18. The system of claim 9 wherein said at least one insurance claim workfile is retrievable based on pre-defined criteria defined by a user.

19. A method of reinspecting insurance claim appraisals comprising the steps of:
providing a remote computer in communication with a wide area network, said wide area network in communication with a computer in a home office;
generating at least one insurance claim workfile, each of said insurance claim workfiles containing data on an insured, data on a claim, data on satisfying a claim, data on the reinspection, wherein each of said insurance claim workfiles is configured to receive all data pertinent to the claim;
reinspecting by the remote computer each of said insurance claim workfiles at the remote computer and determining that the data contained in the insurance claim workfile conforms to pre-defined criteria;
modifying by the remote computer each of said insurance claim workfiles at the remote computer to update the insurance claim workfile with information determined from reinspecting said insurance claim workfiles;
prioritizing each of said insurance claim workfiles based upon said pre-defined criteria;
selecting one of said insurance claim workfiles to reinspect;
reviewing estimate data contained in said one of said insurance claim workfiles, said estimate data comprising information relating to an extent of loss in an insurance claim represented by said one of said insurance claim workfiles;
reviewing appraisal data contained in said one of said insurance claim workfiles, said appraisal data comprising information relating to a value of an insured property; and
analyzing said estimate data and appraisal data and compiling said analyzed estimate data and appraisal data into reinspection data.

20. A system for reinspecting insurance claim appraisals comprising:
a first computer having a memory containing insurance claim assignment data; and a second computer having means for entering data related to a reinspection of estimate data in an insurance claim workfile generated from the insurance claim assignment data, the insurance claim workfile containing data on an insured and data on a claim, wherein said insurance claim workfile is transferable over a wide area network;

said wide area network having a communications server in communication with said first and second computers, said communications server having insurance claim profile data comprising threshold information on a vehicle loss; and wherein the insurance claim workfile is an electronic workfile comprising claim estimate data describing the extent of an insurance claim, claim appraisal data describing the value of an insured property, and claim reinspection data describing an analysis of said estimate data and said appraisal data in conjunction with the insurance claim profile data.

21. The system of claim 20 further comprising a user interface for providing access to at least one insurance claim workfile.

22. The system of claim 21 wherein the interface comprises an in box for receiving said at least one insurance claim workfile from the communications server.

23. The system of claim 21 wherein the interface comprises an out box for temporarily storing said at least one insurance claim workfile, said out box for transmitting the at least one insurance claim workfile to the communications server.

24. The system of claim 21 wherein the interface comprises an in process box for storing at least one insurance claim workfile a user is currently working on.

25. The system of claim 9, further comprising:
a remote computer in communication with the first computer through the wide area network;
a user interface installed on the remote computer, where the user interface is configured to retrieve an insurance claim workfile from the first computer through the wide area network in response to a first command from a user, and where the user interface is configured to initiate an operation of the appraisal review generator to the retrieved insurance claim workfile in response to an appraisal command from a user.

26. The system of claim 25, where the remote computer is a stand-alone computer intermittently connected with the wide area network.

27. The system of claim 25, where the first command comprises forming a connection between the remote computer and the wide area network.

28. The system of claim 25, where the first command comprises selection of an inbox icon in the user interface.

29. The system of claim 25, where the user interface is further configured to upload a reviewed insurance claim workfile to the first computer in response to a second command from a user.

30. The system of claim 25, where the second command comprises selection of an outbox icon in the user interface.

31. The system of claim 9, wherein:
the appraisal review generator is further configured to identify a set of insurance claim workfiles having high priority ratings.

32. The system of claim 9, wherein:
the appraisal review generator is further configured to identify a set of insurance claim workfiles that have high priority ratings while meeting a user-selected criterion.

33. The system of claim 32, where the user-selected criterion is a vehicle type.

34. The system of claim 32, where the user-selected criterion is an appraisal source.

35. The system of claim 9, wherein the insurance claim workfiles include graphical images.

36. The system of claim 9, wherein the appraisal review generator is further configured to assess appraisal performance personnel based on the generated priority ratings.

37. The system of claim 9, wherein the appraisal review generator is further configured to generate performance feedback for appraisers.

38. The system of claim 37, where the appraisers include repair shops.

39. The system of claim 9, wherein the appraisal review generator is further configured to report trends in insurance claim estimates from an appraiser.

40. The system of claim 9, further comprising two or more second computers in communication with the first computer through the wide area network, where each of the two or more second computers is configured to access a shared insurance claim workfile from the first computer.

41. The system of claim 9, where the comparator is configured to flag a loss estimate in an insurance claim workfile as an exception if a supplement amount in the insurance claim workfile exceeds an original estimate in the insurance claim workfile by a predetermined amount.

42. The system of claim 41, where the predetermined amount is specified as a percentage of the original estimate in the insurance claim workfile.

43. The system of claim 9, further comprising:
a policy updating interface, useable by an insurance company to update appraisal rules in the insurance claim profile database.

44. The system of claim 43, where the insurance claim profile database comprises a plurality of insurance claim profiles corresponding to a plurality of client insurance companies.

45. The system of claim 9, further comprising:
a communications server report generator configured to generate reports with a format that presents appraisal review rules and appraisal review results, with appraisal review results adjacent to the corresponding appraisal review rules.

46. The system of claim 9, wherein the appraisal review generator is configured to automatically update an insurance claim workfile in response to actions taken by a reinspector.

47. The system of claim 46, wherein the appraisal review generator is configured to automatically create time-stamped entries in an insurance claim workfile indicative of actions taken by a reinspector.

* * * * *